(12) United States Patent
Baechtold et al.

(10) Patent No.: US 7,787,350 B2
(45) Date of Patent: Aug. 31, 2010

(54) DATA STORAGE DEVICE

(75) Inventors: Peter Baechtold, Gattikon (CH);
Johannes G. Bednorz, Wolfhausen (CH); Gerd K. Binnig, Wollerau (CH);
Giovanni Cherubini, Rueschlikon (CH);
Evangelos S. Eleftheriou, Zurich (CH);
Michel Despont, Au (CH)

(73) Assignee: International Business Machines Corporation, Armonk, NY (US)

( * ) Notice: Subject to any disclaimer, the term of this patent is extended or adjusted under 35 U.S.C. 154(b) by 1252 days.

(21) Appl. No.: 11/329,466

(22) Filed: Jan. 11, 2006

(65) Prior Publication Data

US 2006/0187803 A1 Aug. 24, 2006

(30) Foreign Application Priority Data

Jan. 13, 2005 (EP) .................................. 05405016

(51) Int. Cl.
*G11B 9/00* (2006.01)
(52) U.S. Cl. ....................................................... 369/126
(58) Field of Classification Search .................. 369/126; 977/943, 947
See application file for complete search history.

(56) References Cited

U.S. PATENT DOCUMENTS

| | | | | |
|---|---|---|---|---|
| 5,426,631 A | * | 6/1995 | Miyazaki et al. ............ 369/126 |
| 5,461,605 A | * | 10/1995 | Takimoto et al. ............ 369/126 |
| 5,481,528 A | * | 1/1996 | Eguchi et al. ................ 369/126 |
| 5,574,279 A | * | 11/1996 | Ikeda et al. ..................... 850/56 |
| 5,883,705 A | * | 3/1999 | Minne et al. .................... 355/71 |
| 6,851,301 B2 | * | 2/2005 | Kim et al. ........................ 73/105 |
| 7,149,180 B2 | * | 12/2006 | Onoe et al. .................. 369/276 |
| 2003/0053400 A1 | * | 3/2003 | Cho et al. ..................... 369/126 |
| 2003/0179685 A1 | * | 9/2003 | Nam ............................ 369/126 |
| 2003/0218960 A1 | * | 11/2003 | Albrecht et al. ............. 369/126 |
| 2004/0090903 A1 | * | 5/2004 | Cho et al. ..................... 369/126 |

\* cited by examiner

*Primary Examiner*—Wayne R Young
*Assistant Examiner*—Thomas D Alunkal
(74) *Attorney, Agent, or Firm*—Cantor Colburn LLP; Vazken Alexanian

(57) ABSTRACT

A storage device including a storage medium for storing data in the form of topographic or magnetic marks. At least one probe is mounted on a common frame, the common frame and the storage medium designed for moving relative to each other for creating or detecting said marks. Each probe includes a tip facing the storage medium, a read sensing element, a write element and a capacitive platform, that forms a first electrode and is designed for a voltage potential applied to it independent from a control signal for said read sensing element and for said voltage potential applied to said capacitive platform being independent from a control signal for said write heating element. It further comprises a second electrode arranged in a fixed position relative to the storage medium forming a first capacitor together wherein said first electrode and a medium between the first and second electrode.

1 Claim, 4 Drawing Sheets

DATA STORAGE DEVICE

TECHNICAL FIELD

The present invention relates to a storage device for storing data and a method for operating a storage device.

BACKGROUND OF THE INVENTION

In the field of this invention techniques are known that use nanometer sharp tips for imaging and investigating the structure of materials down to the atomic scale. Such techniques include atomic force microscopy (AFM) and scanning tunneling microscopy (STM), as disclosed in EP 0 223 918 B1 and U.S. Pat. No. 4,343,993.

Based on the developments of the scanning tunneling microscopy and the atomic force microscopy, new storage concepts have been introduced over the past few years profiting from these technologies. Probes having a nanoscale tip are being introduced for modifying the topography and for scanning an appropriate storage medium. Data are written as sequences of bits represented by topographical marks, such as indentation marks and non-indentation marks. The tips comprise apexes with a radius in the lower nanometer range and the indentation marks have for example a diameter in the range of 20 to 40 nm. Hence, these data storage concepts promise ultra-high storage area density.

A storage device for storing data based on the AFM principle is disclosed in "The millipede—more than 1,000 tips for future AFM data storage" by P. Vettiger et al., IBM Journal Research Development, Vol. 44, No. 3, March 2000. The storage device has a read and write function based on a mechanical x-, y-scanning of a storage medium with an array of probes each having a tip. The probes operate in parallel, each probe scanning during operation an associated field of the storage medium. That way high data rates may be achieved. The storage medium comprises a thin polymethylmethacrylate (PMMA) layer. The tips are moved across the surface of the polymer layer in a contact mode. The contact mode is achieved by applying small forces to the probes so that the tips of the probes can touch the surface of the storage medium. For that purpose, the probes comprise cantilevers which carry the sharp tips on their end sections. Bits are represented by indentation marks or non-indentation marks in the polymer layer. The cantilevers respond to these topographic changes in the surface while they are moved across the surface. Indentation marks are formed on the polymer surface by thermomechanical recording. This is achieved by heating a respective probe with a current or voltage pulse during the contact mode in a way that the polymer layer is softened locally where the tip touches the polymer layer. The result is a small indentation on the layer having a nanoscale diameter.

Reading is also accomplished by a thermomechanical concept. The heater cantilever is supplied with an amount of electrical energy, which causes the probe to heat up to a temperature that is not high enough to soften the polymer layer as is necessary for writing. The thermal sensing is based on the fact that the thermal conductance between the probe and the storage medium, especially a substrate on the storage medium, changes when the probe is moving in an indentation as the heat transport is in this case more efficient. As a consequence of this, the temperature of the cantilever decreases and hence, also its electrical resistance changes. This change of electrical resistance is then measured and serves as the measuring signal.

In STM a sharp tip is scanned in close proximity to the surface and voltage applied between the tip and the surface gives rise to a tunnel current that depends on the tip-surface separation. From a data-storage point of view, such a technique may be used to image or sense topographic changes on a flat medium that represent a stored information in logical "0s" and "1s". In order to achieve reasonable stable current, the tip-sample separation must be maintained extremely small and fairly constant. In STM, the surface to be scanned needs to be of an electrically conductive material.

Japanese Patent Abstract JP 08297870 discloses a data storage device, where a probe needle tip is brought into contact with a recording layer surface and a recording pulse voltage is applied. A current is made to flow between the probe and the substrate. The temperature of the recording layer is raised partially by the heat caused by current. This softens the recording layer. Succeedingly, the needle tip is pushed into the recording layer by a repulsive force to form the recording bit having a recessed structure.

WO 02/077988A2 discloses a method and an apparatus for writing data to and/or reading data from locations on a surface via a tip. The apparatus is designed for moving the tip between the locations on the surface. At each location, energy is selectively applied to the surface via the tip and the tip and the surface are selectively forced together in synchronization with the selective application of energy. Moving the tip into and out of contact with the surface is achieved by selective generation of a force field, which comprises an electric field.

WO 02/37488A1 discloses read/write components for AFM-based data storage devices. The read/write component comprises lever means and a support structure. The lever means is connected to the support structure for substantially pivotal movement. The lever means provides first and second current paths between a pair of electrical supply lines on the support structure, via which the lever means can be connected in use to power supply means operable in a write mode and a read mode. A write-mode heater is provided on the lever means in the first current path, and a read/write tip is provided on the write-mode heater. A read-mode heater is provided on the lever means in the second current path.

A fairly long life cycle for storage devices is important. Therefore, it is a challenge to provide a data storage device based on local probe techniques and a method for operating a storage device based on local probe techniques, which enables a reliable operation for a long period of time without significant medium or tip wear.

SUMMARY OF THE INVENTION

Therefore, according to one aspect of the invention, a storage device is provided, comprising a storage medium for storing data in the form of marks, e.g. topographic or magnetic marks but not necessarily limited to these. At least one probe is mounted on a common frame; the common frame and the storage medium are designed for moving relative to each other for creating or detecting the marks. The marks represent data, preferably logical "1"s whereas the absence of marks preferably represents logical "0"s.

In an embodiment of the storage device, the capacitive platform is electrically insulated from the read sensing element and is electrically insulated from the write heating element. This enables to use a power supply which supplies only voltage of one polarity and simplifies the circuitry needed to distribute the voltages to various terminals of the storage device.

According to a second aspect of the invention, a storage device is provided, comprising an electrically conductive storage medium for storing data in the form of topographic marks. At least one probe is mounted on a common frame. The common frame and the storage medium are designed for moving relative to each other for creating or detecting topographic marks. Preferably also in this case, an array of probes is provided. Each probe comprises an electrically conductive nanoscale tip facing the storage medium and being controlled within electron tunneling distance to the electrically conductive storage medium, at least during a reading operation. Each probe further comprises a write element and a capacitive platform that forms a first electrode and is designed for applying a voltage potential to it independent from a control signal for the write element. A second electrode is arranged in a fixed position relative to the storage medium forming a capacitor together with the first electrode and a medium between the first and second electrode. Preferably, the second electrode is formed by the electrically conductive storage medium. It may, however, also be formed in a way described above in the context of the first aspect of the invention.

According to a third aspect of the invention, a method for operating the storage device is claimed comprising the step of varying a voltage potential applied to the capacitive platform depending on a desired distance between the tip and the storage medium, or on a desired force exerted by the tip apex on the storage medium, and grounding the second electrode. In that way it is possible to control the distance and/or the force individually for each probe or for a group of probes in a simple way. This enables to control probes that are currently neither performing a write nor a read procedure to being spaced apart from the medium at a desired distance, which then significantly reduces wear of the tips and reduces friction. Misalignments of the probes may easily be corrected by adjusting the voltage potential of the capacitive platforms. Only voltage of one polarity needs to be applied, which reduces the complexity of an associated control circuitry.

BRIEF DESCRIPTION OF THE DRAWINGS

The invention and its embodiments will be more fully appreciated by reference to the following detailed description of presently advantageous but nonetheless illustrative embodiments in accordance with the present invention when taken in conjunction with the accompanying drawings. Different figures may contain identical references, representing elements with similar or uniform content.

The figures are described herein, in which.

Figure 1:
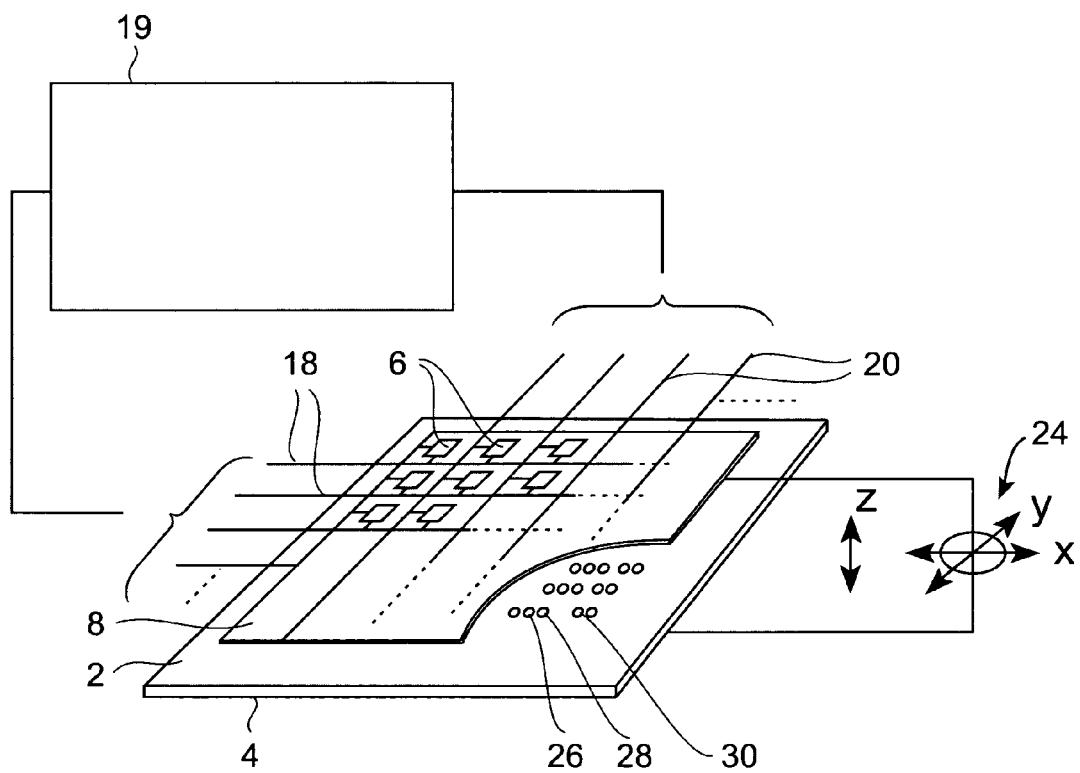
FIG. 1, illustrates a perspective view of a storage device.

REFERENCE NUMERALS 2 storage medium
4 substrate
6 probe
8 frame
10, 12, 14, 16 first to fourth terminal
18 row-lines
20 column-lines
19 control and information processing unit
24 scanner
x x-direction
y y-direction
26, 28, 30 marks
32 spring cantilever
34 tip
36 apex
38 write-heating element
40 write resistor
42 read-sensing-element
44 read-resistor
46 capacitive platform
48 electrode layer
50 electrode body
51-55 first—fifth leg of cantilever
56 read-capacitive platform
58, 60 electrical decoupling structure
61 further leg
62, 64 terminal
66, 68 first, second part of capacitive platform
70 additional leg

DETAILED DESCRIPTION OF THE INVENTION

The present invention provides a storage device comprising a storage medium for storing data in the form of marks, e.g. topographic or magnetic marks but not necessarily limited to these. At least one probe is mounted on a common frame; the common frame and the storage medium are designed for moving relative to each other for creating or detecting the marks. The marks represent data, preferably logical "1"s whereas the absence of marks preferably represents logical "0"s.

Each probe comprises a tip with a nanoscale apex facing the storage medium, a read sensing element and a write element. Each probe further comprises a capacitive platform, which forms a first electrode and is designed so that a voltage potential can be applied to the capacitive platform, which is independent from a control signal for the read sensing element and which is independent from a control signal for the write element. The capacitive platform may physically be formed from more than one part. A first capacitor is formed by the first electrode and a medium between the first and a second electrode and by the second electrode that is arranged in a fixed position relative to the storage medium.

The storage device has the advantage that a voltage potential of the capacitive platform may be set in order to control a distance between an apex of the tip and a surface of the storage medium and/or to control a force exerted by the tip apex on the storage medium by means of an electrostatic force created by an electrical field between said capacitive platform and said second electrode. Preferably, the storage device comprises more than one probe, as this increases the possible data rates for writing or reading data. The storage device enables an individual control of the distance for each individual probe or for a group of probes by applying a respective voltage potential to the respective capacitive platforms of the probes. This individual control of the distance of the apex of the tip and the surface of the storage medium is even possible if the second electrode is common to at least some of the probes, which is preferred for an ease of manufacturing. This individual or groupwise control enables a control of probes that are idle for being spaced apart from the medium at a desired distance, which then significantly reduces wear of the tips and reduces friction. The capacitive platform may serve as part of the write element and at the same time enable control of the distance between the probe and the storage medium.

The second electrode may also be the storage medium, if the storage medium is of a material that is suited to form an electrode, i.e. the storage medium is electrically conductive. A second electrode may, if it is not formed by a storage medium, be located in a way that the storage medium is located between the second electrode and the first electrode. It may, however, also be located in a fixed position relative to the storage medium in a way that the first electrode is located between the second electrode and the storage medium. Misalignment of the array of probes may easily be corrected by adjusting the voltage potential of the capacitive platforms.

In an advantageous embodiment of the storage device, the capacitive platform is electrically insulated from the read sensing element and is electrically insulated from the write heating element. This enables to use a power supply which supplies only voltage of one polarity and simplifies the circuitry needed to distribute the voltages to various terminals of the storage device.

In a further advantageous embodiment of the storage device, the read sensing element is a temperature dependent electrical resistor. This enables to detect topographic marks by sensing a change in heat dissipation from the temperature dependent resistor.

In a further advantageous embodiment of the storage device, the read sensing element is a further read capacitive platform forming a third electrode. A further capacitor is formed by the second and third electrode and a medium between the second and third electrode. This has the advantage of low power consumption for a readback process while reading data. It further has the advantage that the speed of reading data is not limited by a thermal time constant, as in the case of a temperature dependent resistor.

The invention, also provides a storage device comprising an electrically conductive storage medium for storing data in the form of topographic marks. At least one probe is mounted on a common frame. The common frame and the storage medium are designed for moving relative to each other for creating or detecting topographic marks. Preferably also in this case, an array of probes is provided. Each probe comprises an electrically conductive nanoscale tip facing the storage medium and being controlled within electron tunneling distance to the electrically conductive storage medium, at least during a reading operation. Each probe further comprises a write element and a capacitive platform that forms a first electrode and is designed for applying a voltage potential to it independent from a control signal for the write element. A second electrode is arranged in a fixed position relative to the storage medium forming a capacitor together with the first electrode and a medium between the first and second electrode. Preferably, the second electrode is formed by the electrically conductive storage medium. It may, however, also be formed in a way described above in the context of the first aspect of the invention.

In an advantageous embodiment, the capacitive platform is electrically insulated from the write element. This enables to use a power supply which supplies only voltage of one polarity and simplifies the circuitry needed to distribute the voltages to various terminals of the storage device.

The invention, also provides a method for operating the storage device is claimed comprising the step of varying a voltage potential applied to the capacitive platform depending on a desired distance between the tip and the storage medium, or on a desired force exerted by the tip apex on the storage medium, and grounding the second electrode. In that way it is possible to control the distance and/or the force individually for each probe or for a group of probes in a simple way. This enables to control probes that are currently neither performing a write nor a read procedure to being spaced apart from the medium at a desired distance, which then significantly reduces wear of the tips and reduces friction. Misalignments of the probes may easily be corrected by adjusting the voltage potential of the capacitive platforms. Only voltage of one polarity needs to be applied, which reduces the complexity of an associated control circuitry.

In an advantageous embodiment of the method for operating the storage device with at least two probes, and during a read mode the capacitive platforms only of active probes are provided with a given voltage pulse of a given duration. Active probes are probes which currently are controlled to form marks or to read marks. By appropriately choosing the voltage potential and the duration of the voltage pulse, this ensures in an easy way that wear of the tips and friction is reduced.

In a further advantageous embodiment of the method with a storage device comprising at least two probes, during a write mode capacitive platforms only of active probes are provided with a given further voltage pulse of a given duration. By appropriately choosing the voltage potential and the duration of that further voltage pulse, an appropriate force for forming respective topographic marks can be adjusted. This enables a so called cold write mode, in which the formation of the topographic mark does not need to be assisted by additionally heating the storage medium. Therefore, the write heating element might be obsolete in such a case.

In another advantageous embodiment of the method, the probes are grouped into various probe subsets and the probes of each group are controlled with the same control parameters in respect of their respective capacitive platforms. Control parameters comprise the voltages applied to the capacitive platforms. This enables a less complex implementation of the control circuitry and enables to provide a more sophisticated control on the other hand. The grouping into the various subsets might also depend on common properties of the probes belonging to one subset such as spring properties and/or distance properties relative to the storage medium.

FIG. 1 shows a perspective view of a storage device that is used for storing data. Preferably, a storage medium 2 is formed by a thin polymer layer. The polymer layer may be formed of a thin polymethylmethacryllate (PMMA) layer. The storage medium 2 may, however, also consist of different materials like an electrically conductive material or patterned magnetic material. The storage medium 2 is supported by a substrate 4. The substrate 4 is preferably formed of silicon.

An array of probes 6 is mounted on a common frame 8. Only a few probes are shown in FIG. 1. The storage device may, however, comprise a large number of probes, such as 1024 or even a significantly larger number of probes. However, the storage device may also comprise only just one probe 6.

Each probe 6 comprises terminals, preferably first to fourth terminals 10, 12, 14, 16 (FIG. 3), which are electrically connected to a control and information processing unit 19 via electrically conductive lines. The terminals 10 to 16 may all be individually connected to the control and information processing unit 19. However, in order to reduce the complexity of the wiring, the terminals may also be connected via row-lines 18 and column-lines 20 and possibly via non-shown multiplexers to the control and information processing unit 19.

The control and information processing unit 19 is designed for creating control parameters applied to the probes via the terminals 10, 12, 14, 16 or sensing parameters present on the terminals 10 to 16, such as a current or a voltage potential, for the write or read mode. The control and information processing unit 19 is further designed for controlling a movement of the storage medium 8 and the substrate 2 relative to the frame 8 in an x and y direction. The actuation for this is accomplished by a scanner 24.

Hence, the storage medium 2 and the frame 8 containing the probes 6 are movable relative to each other. A relative movement in a z-direction is accomplished by applying respective electrostatic forces on the probes 6 as described in detail below.

In the storage medium 2 marks 26 to 30 are present, which represent logical information. Preferably, they form topographic marks and may represent as indentation marks logical "1s" whereas the absence of the indentation marks may represent logical "0"s. The marks 26 to 30 are of a nanoscale diameter. In FIG. 1, only a few marks 26 to 30 are shown, which also do not represent their real physical properties. The few marks 26 to 30 are just shown by way of example.

Figure 2:
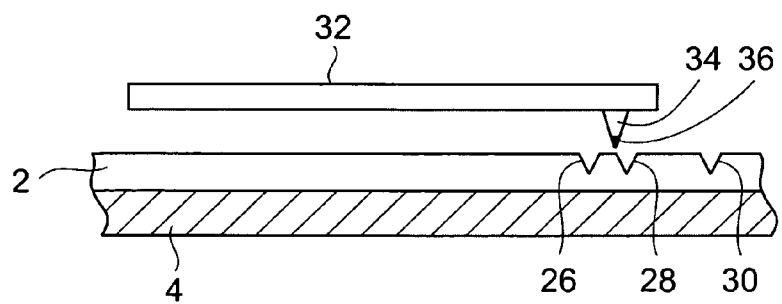
FIG. 2, illustrates a cross-sectional view of part of the storage device according to FIG. 2, FIG. 3, illustrates a schematic top view of a probe arranged in the storage device according to FIG. 1, FIGS. 4 to 7, illustrate different embodiments of the probe according to FIG. 3, focusing on electrical properties of the probe

In FIG. 2, a cross-sectional view of the storage device according to FIG. 1 is shown. Part of a probe 6 is shown. The probe 6 comprises a spring cantilever 32 on which a tip 34 is mounted having an apex 36 having a radius in the low nanometer range, preferably in a range of 100 nm or less, in another advantageous embodiment in a range of 50 nm or less, in a further advantageous embodiment in a range of 10 nm or less, and according to another advantageous embodiment in a range of 20 to 40 nm. The marks 26 to 30, shown as indentation marks, are formed by pushing the apex 32 of the tip into the storage medium 2.

Figure 3:
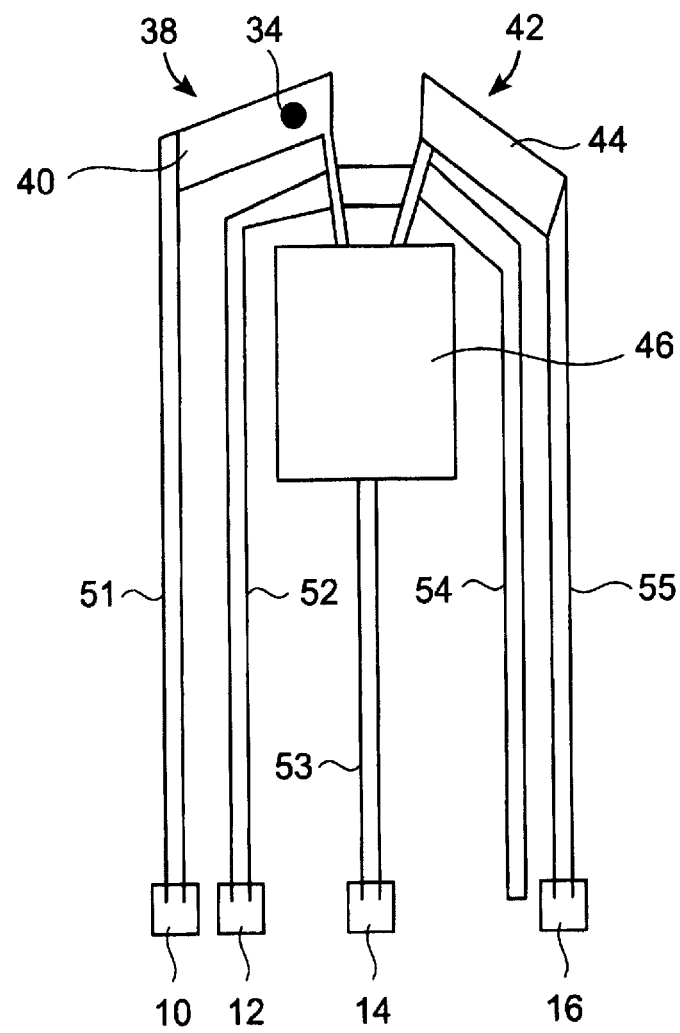

The probe 6 comprises the spring cantilever 32, which may comprise various legs, for example $1^{st}$ to $5^{th}$ legs 51-55 (FIG. 3). The representation of the probe in FIG. 3 is a very schematic representation of the probe. The actual design of the physical properties of the spring cantilever 32 may vary in the form. Some or all of the legs 51 to 55 comprise terminals 10 to 16, which serve as connecting points for electrically conductive lines, electrically connecting the terminals to the control and information processing unit. Preferably, the row-lines 18 and column-lines 20 are connected to the terminals 10 to 16. In actual designs, the amount of terminals may vary, as is described in further detail below.

The $1^{st}$ to $5^{th}$ legs 51-55 are designed to give the spring cantilever 32 spring properties with a given spring constant. They are preferably fabricated entirely of silicon for good thermal and mechanical stability. The $1^{st}$ to $5^{th}$ legs 51 to 55 of the spring cantilever 32 are preferably highly doped in order to minimize the electrical resistance as they also serve the purpose of an electrical connection to a write heating element 38, a read sensing element 42 and a capacitive platform 46. Preferably also the write heating element 38, the read sensing element 42 and the capacitive platform 46 are fabricated of silicon. The write heating element 38 and the read sensing element 42 preferably comprise a temperature dependent write-resistor 40 and respectively a temperature dependent read-resistor 44, which are formed by less doped silicon, which yields a high electrical resistance of, for example, 11 kΩ. The tip 34 is mounted on the probe in good thermal connection to the write heating element 38. It may also be fabricated from silicon.

The capacitive platform 46 is preferably highly doped in order to minimize its electrical resistance. The capacitive platform 46 is arranged essentially parallel to the surface of the storage medium 2. It acts as a first electrode of a first capacitor, further comprising a second electrode and a dielectric medium between the first and second electrode. The second electrode may be formed by the storage medium 2 if the storage medium 2 is an electrically conductive material. It may, however, also be formed by the substrate 4, which may in the case of the substrate 4 being fabricated from silicon be respectively doped in order to provide a low electrical resistance. The second electrode may, however, also be formed in a separate layer between the storage medium 2 and the substrate 4 or on the side of the substrate 4 facing away from the storage medium 2. The second electrode needs to be arranged in a fixed position relative to the storage medium 2 in order to enable a z-control via an electrostatic force created by charging the first capacitor respectively. The medium between the first and a second electrode is formed by the air gap between the first electrode and the storage medium and, if the second electrode is formed by the substrate 4, the medium between the first and second electrode further comprises the storage medium 2.

The write resistor 40 (FIG. 4) is electrically connected to the first terminal 10 and is electrically connected to the second terminal 12 in a first embodiment of the probe 6. The read resistor 44 is on one hand electrically connected to the fourth terminal 16 and on the other hand electrically connected to the second terminal 12. The capacitive platform 46 is electrically connected to the third terminal 14. The second terminal 12 is during operation of the storage device grounded. The second electrode is also grounded during operation of the storage device.

During the write mode, the z-position of the apex 36 of the tip 34 is controlled by varying the voltage potential of the first electrode provided from the control and information processing unit 19 to the third terminal 14. In addition to that a force with which the tip is pressed onto the storage medium 2 may be adjusted by varying the voltage potential of the first electrode. This may be achieved by an open or closed loop control, preferably a closed loop control. The feedback may be obtained by a readback signal during a read mode.

In the write mode, the probe 6 may be moved across its assigned field of the storage device 2. The distance between the apex and the tip is controlled to a given distance between the storage medium 2 and the apex of the tip. Only when a mark 26, 28, 30 is to be formed, a respective further voltage pulse is applied to the capacitive platform 46, which results in a desired electrostatic force pressing the apex 36 of the tip into the storage medium 2. In a timely synchronized manner, the write-resistor 40 is provided with a given heating current or voltage pulse on first terminal 10. This in turn results in a heat pulse locally heating up the storage medium 2 and softening it in that way. The tip 34 then forms a small indentation, which serves as a mark 26 to 30. The indentation has a diameter in the lower nanometer range, such as, for example, around 30 nm. The probe is scanned across the storage medium 2 with a given speed. The mark 26 to 30 may however also be formed by solely providing the heating current or voltage pulse or by solely providing the further voltage pulse to the capacitive platform 46.

During the read mode of the storage device the probe 6 scans over its assigned field of the storage medium 2. The voltage potential on the third terminal 14 and in that way of the first electrode 46 may during that read mode be set such that the apex 36 of the tip 34 continuously moves in very close contact to the surface of the storage medium across the storage medium 2.

Preferably, the voltage potential on the capacitive platform 46 is then set such that the tip 34 with its apex 36 is pressed with a given force onto the storage medium 2. When the tip 34 is then scanned over a topographic mark 26 to 30 it is—in case of an indentation—pushed into the indentation. In timely synchronization of an expected movement of the tip 34 into the indentation of the mark 26 to 30 a respective voltage pulse is applied to the read element, in this case the read-resistor 44, via the fourth terminal 16, which results in heating up the read-resistor 44. When the tip moves into the indentation representing the mark 26 to 30, the distance between the read resistor 44 and the medium and the substrate decreases. This results into a change of the heat dissipation from the read resistor 44 and can be sensed in the control and information processing unit 19.

In an alternative embodiment of operating the storage device, the read element 42, in this case the read resistor 44, may continuously be provided with a respective voltage potential via the fourth terminal 16 resulting in continuous heat dissipation.

The capacitive platform 46 may instead of being continuously supplied with a respective voltage potential via the third terminal 14 leading to a given force pressing the apex 36 of the tip onto the storage medium 2 be only supplied with voltage pulses synchronized with read events, that is only when it moves closely to a location on the storage medium 2 where a mark 26 to 30 could possibly be present. This reduces the friction that the tip 34 is subjected to. In addition to that, preferably only those probes 6 which actively are in a read mode or in the write mode are supplied with respective voltage pulses on their third terminal 14 and via that on their capacitive platform 46. The other probes 6, which are idling and therefore not currently actively reading or writing respective data, may be grounded on the third terminal 14 and via that on their capacitive platform 46. By this, the friction on the tips 34 is further reduced. This reduction in friction acting on the tips 34 results in a reduced wear of the tips 34 and in that way in a longer lifetime of the tips 34.

In addition to that, the capacitive platforms 46 of the various probes 6 of the storage device may in case of an existing respective wiring be individually controlled. In that way, the individual properties of each respective probe 6 may be accounted for. From the point of the complexity of the wiring via the conductive lines, it is preferred, however, to allocate the probes 6 into various subsets and in that way cluster the probes and control each subset of probes at least in respect of the z-position control in common. This enables on the one hand to implement more complex control algorithms in the control and information processing unit 19 under given limits of a computing power. On the other hand, the complexity of the wiring via the conductive lines may be reduced. The allocation to the various subsets takes into account spring properties and/or distance properties relative to the storage medium 2.

It is clear from the given description that the read and write mode may be accomplished by electronic circuitry which only provides unipolar voltages to the first, third and fourth terminals 10, 14, 16. This enables to use cost effective technologies, such as CMOS transistor technologies.

Preferably, the storage medium is divided into a number of fields, each being assigned to one of the probes 6. Respective timing information for synchronizing the respective voltage or current pulses being applied to the second, third and fourth terminal 12, 14, 16 is obtained by specially assigned clock fields. Preferably, the scanner 24 is controlled such that during the write mode or, respectively, the read mode marks are written or respectively read, along consecutive tracks in a linear manner. Preferably, consecutive marks are written in lines along each track or respectively read in lines along each track. However, the scanner 24 may also be controlled in another way in order to read or write data.

Figure 5:
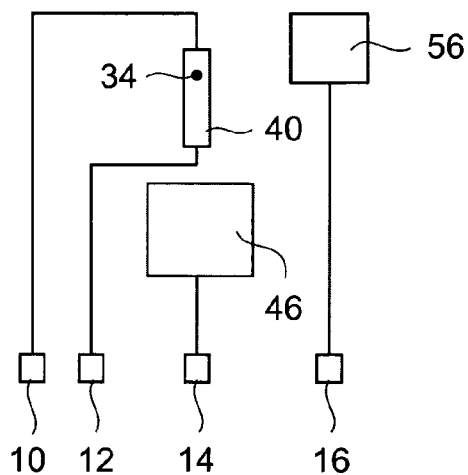

FIG. 5 shows an alternative embodiment in view of the electrical properties of the probe 6. In this embodiment, the read sensing element 42 comprises a read capacitive platform 56. This read capacitive platform 56 forms a third electrode that forms together with the second electrode and the medium between the third and second electrode a second capacitor. The third electrode and by that the read capacitive platform 56 is electrically connected to the fourth terminal 16. The read mode is accomplished in that embodiment by sensing the changing capacity of the second capacitor when the tip 34 moves into a mark 26 to 30. This may be accomplished by sensing the amount of charge that needs to be provided to the read capacitive platform 56 in order to maintain a given voltage potential on the fourth terminal 16. This capacitive sensing principle has the advantage of low power consumption.

Figure 4:
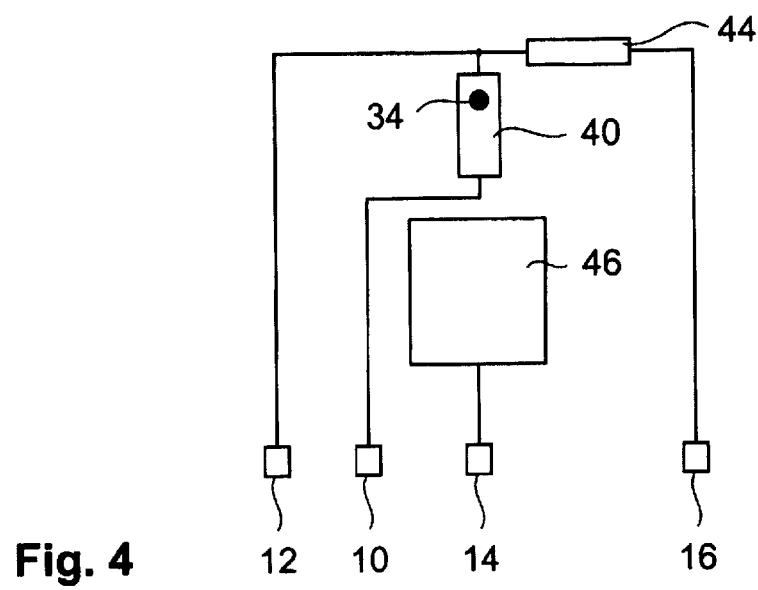
Figure 8:
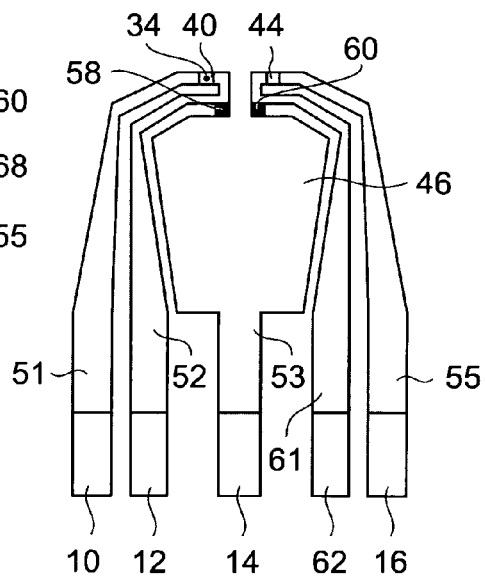

FIG. 8 shows a first possible physical design of the probe 6 with the electrical properties of the embodiment according to FIG. 4. A further leg 61 with a further terminal 62 is provided to improve the mechanical properties of the cantilever spring 32. The further terminal 62 is grounded during operation of the storage device as is the case for the second terminal 12. The further terminal 62 is electrically connected to the read-resistor 44 via the further leg 61. The first to fourth leg and the further leg 51, 52, 53, 55, 61, the capacitive platform 46, the write-resistor 40 and the read-resistor 44 and the tip 34 are mechanically coupled to each other. In order to obtain the desired electrical properties, electrical decoupling structures 58, 60 are provided. They may, for example, be obtained by defining a zone doped with dopant of a different type from the rest of the cantilever structure to obtain a p-n junction (diode) that, while being polarized in reverse bias, provides the desired electrical insulation. Another means to obtain an electrical decoupling is to introduce a bridge using insulating materials such as $Si_3N_4$ or $SiO_2$ between the conductive parts of the cantilever structure. Also, the further designs of the probe 6 described in the following comprise such electrical decoupling structures, which are, generally, referenced by reference numerals 58 and 60.

Figure 9:
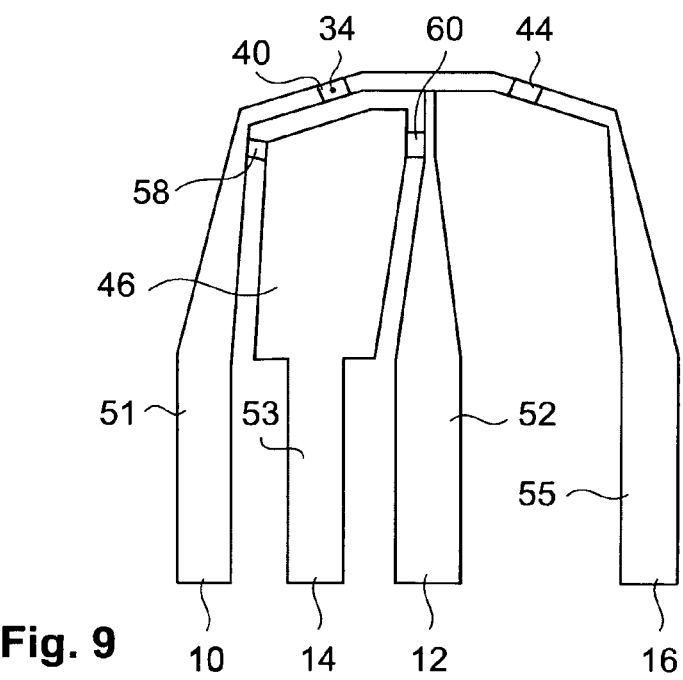
FIGS. 8 to 12, illustrate different embodiments of the probe showing its physical properties.

FIG. 9 shows another embodiment of a design of a probe 6 with the electrical properties according to the embodiment of FIG. 4. In this embodiment, both the write-resistor 40 and the read-resistor 44 are connected to the second terminal 12 via the second leg 52. The capacitive platform 46 is asymmetrically located with respect to the centered second leg 52.

Figure 10:
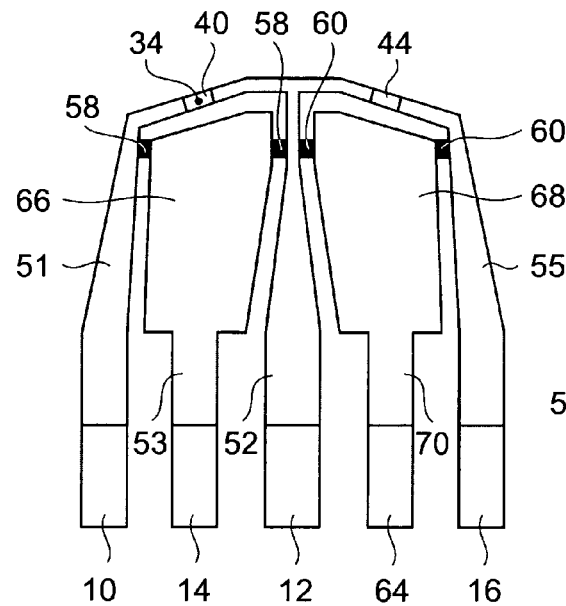

In a further design of the probe 6 according to FIG. 10 having the electrical properties of the embodiment of the probe 6 according to FIG. 4, the capacitive platform 46 is divided into a first and a second part 66, 68. The first part 66 is connected via the third leg 53 to the third terminal 14 whereas a second part 68 is electrically connected to an additional terminal 64 via an additional leg 70. The first capacitor is in this case divided into two sub-capacitors with a part one first capacitor and a part two first capacitor. In this case, preferably, the second terminal 14 and the additional terminal 64 are provided with the same voltage potentials.

Figure 11:
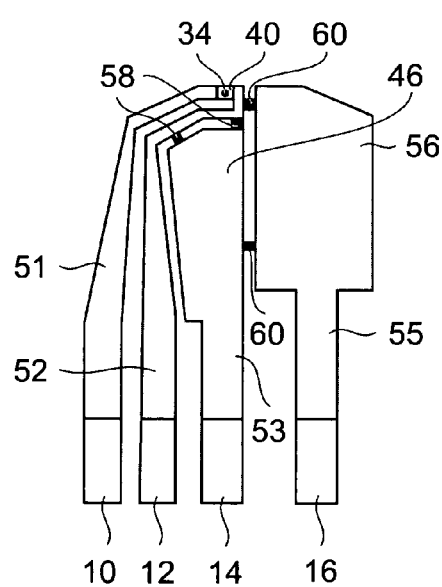
Figure 12:
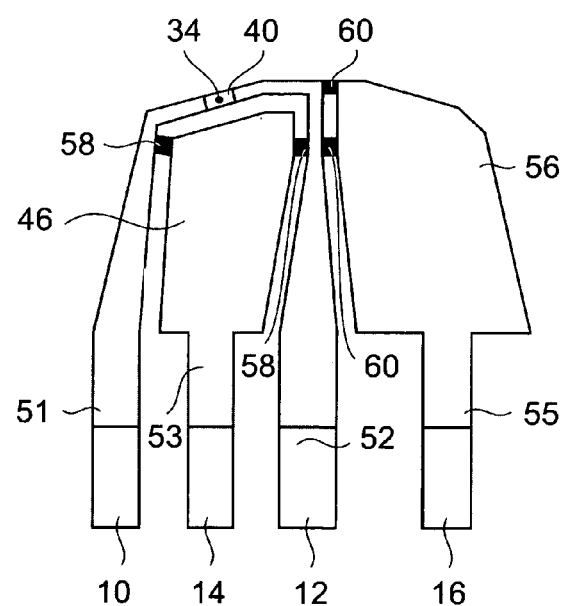

Further designs of the probe 6 with the electrical properties of the embodiment according to FIG. 5 are shown in FIGS. 11 and 12. The probes of both embodiments comprise a read capacitive platform 56.

Figure 6:
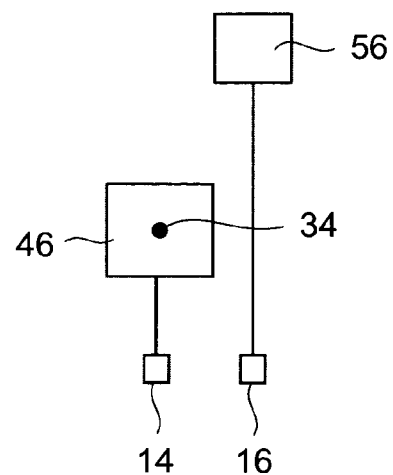
Figure 7:
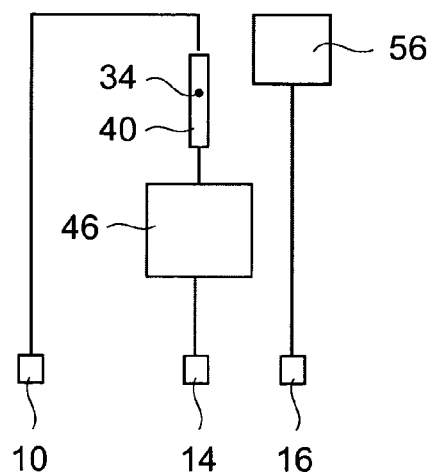

FIGS. 6 and 7 show further alternative embodiments of the probe with different electrical properties, where the amount of terminals is less than four. According to FIG. 6, only two terminals 14 and 16 are necessary. In this case, the capacitive platform 46 is provided for a z-position control and writing of marks is achieved in a so-called cold writing process, which is indentation marks are formed solely by pushing the tip 34 with a respective high force into the storage medium 2. The read sensing element 42 consists in this embodiment of the read capacitive platform 56, which is connected to the fourth terminal 16.

In the embodiment according to FIG. 7, the capacitive platform 46 is electrically connected to a resistor 40. In this embodiment, an independent z-position control may be obtained by keeping the difference of the voltage potentials provided on the first terminal 10 and on the third terminal 14 fixed, and by varying the potentials on the terminals 10, 14 with respect to the potential on the second electrode.

The probe may also be fabricated from magnetic material and may in that way form a magnetic dipole. In that way it is possible to write and, respectively, read magnetic marks under the prerequisite that the storage medium 2 contains magnetic domains. For such a magnetic based storage device it is still preferred to have the write heating element 38, which is then also preferably the write-resistor 40 and is thermally coupled with the tip 34. The write-resistor 40 is then heated up when the magnetic mark is to be created as this supports a desired lining up of the respective magnetic domains. In the read mode, the magnetic marks 26 to 30 are detected by sensing a magnetic force interacting between the tip 34 and the storage medium 2.

A further embodiment of the storage device is based on the STM principle. In this case, the storage medium consists of an electrically conductive material such as a phase-change medium, or a ferroelectric or magnetic material. In this embodiment, the write mode may be accomplished respectively to the way the marks are written using the thermal mechanical concept with the storage medium 2 being formed out of a polymer. During the read mode, the tip 32 is controlled in a given tunneling distance relative to the storage medium 2 by sensing a tunneling current through the tip 34 and based on this setting the voltage potential supplied to the capacitive platform 46. A signal representative for the charge of the first capacitor or the second capacitor may be processed in order to detect the marks 26 to 30. Writing of the marks 26 to 30 may in this case also be achieved by a write-element either being the write heating element 38 or also another type of write-element. In this case, the tip 34 is fabricated from electrically conducting material, such as highly doped silicon.

The invention claimed is:
1. A method for operating a storage device comprising:
a storage medium for storing data in the form of marks;
at least two probes mounted on a common frame, the common frame and the storage medium designed for moving relative to each other for creating or detecting the marks, with each probe comprising:
   a tip facing the storage medium;
   a read sensing element;
   a write element; and
   a capacitive platform, the capacitive platform forming a first electrode designed for a voltage potential applied thereto independent from a control signal for the read sensing element and for the voltage potential applied thereto independent from a control signal for the write element; and
a second electrode arranged in a fixed position relative to the storage medium, thereby forming a first capacitor together with the first electrode and a medium between the first and second electrodes;
the method comprising varying a voltage potential applied to the capacitive platform, dependent on a desired distance between the tip and the storage medium or on a desired force exerted by the tip on the storage medium and grounding the second electrode, wherein:
during a read mode, the capacitive platforms only of active probes are provided with a given voltage pulse of a given duration;
during a write mode, the capacitive platforms only of active probes are provided with a given further voltage pulse of a given duration;
the at least two probes allocated into various probe subsets, and controlling probes of each subset with the same control parameters in respect of their respective capacitive platforms; and
wherein each capacitive platform is electrically insulated from the read sensing element and the write element, with the read sensing element comprising a read capacitive platform forming a third electrode, thereby forming a second capacitor together with the second electrode and a medium between the second and third electrodes.

* * * * *